United States Patent [19]

Watson et al.

[11] 4,039,480
[45] Aug. 2, 1977

[54] HOLLOW CERAMIC BALLS AS AUTOMOTIVE CATALYSTS SUPPORTS

[75] Inventors: David R. Watson, Benton; Val G. Carithers, Little Rock; Harold L. Drown, Benton, all of Ark.

[73] Assignee: Reynolds Metals Company, Richmond, Va.

[21] Appl. No.: 560,720

[22] Filed: Mar. 21, 1975

[51] Int. Cl.$^2$ .................. B01J 29/06; B01J 35/00
[52] U.S. Cl. .................. 252/455 R; 252/477 R
[58] Field of Search .......... 252/448, 455 R, 477 R, 252/450; 106/41

[56] References Cited

U.S. PATENT DOCUMENTS

| | | | |
|---|---|---|---|
| 2,553,759 | 5/1951 | Geiger | 106/41 |
| 2,941,960 | 6/1960 | Hindin et al. | 252/450 X |
| 3,150,989 | 9/1964 | Parsons | 106/41 X |
| 3,347,798 | 10/1967 | Baer et al. | 252/448 |
| 3,377,269 | 4/1968 | Bloch | 252/477 R |
| 3,455,843 | 7/1969 | Briggs et al. | 252/477 R |
| 3,467,602 | 9/1969 | Koester | 252/455 R |
| 3,798,176 | 3/1974 | Ao et al. | 252/477 R |

*Primary Examiner*—Carl F. Dees
*Attorney, Agent, or Firm*—Glenn, Lyne, Gibbs & Clark

[57] ABSTRACT

A method for producing essentially spherical dry pellets largely comprising combustible materials, a method for using the pellets as cores by uniformly coating them with a ceramic-forming powder and sintering the powder to volatilize the combustible core material and form hollow ceramic balls, and a method for using the balls as catalyst supports by coating them with platinum and palladium salts and reducing the salts to elemental metals so that satisfactory oxidizing catalysts are obtained. When the ceramic is an aluminosilicate such as mullite, satisfactory oxidizing catalysts are obtained that pass the bulk density, crush strength, dust-free surface, and oxidizing temperature requirements of specifications developed to meet automobile exhaust emission requirements.

19 Claims, No Drawings

HOLLOW CERAMIC BALLS AS AUTOMOTIVE CATALYSTS SUPPORTS

BACKGROUND OF THE INVENTION

1. Field of the Invention

This invention relates to hollow ceramic balls and methods for their manufacture. It particularly relates to spherically-shaped, hollow catalyst supports having thermal stability at elevated temperatures, high crush strength, and low bulk density. It further relates to alumina-based catalysts for oxidative purification of exhaust gases from internal combustion engines.

2. Review of the Prior Art

It has long been recognized that spherically-shaped catalysts are desirable for crush strength, abrasion resistance, and high surface area. Solid alumina spheres were made by tumbling wetted powders, as taught by Getty in U.S. Pat. No. 3,264,069. Solid silica and alumina spheres were also made by gelling droplets of an aqueous solution thereof in an oil bath, as described by Hockstra in U.S. Pat. No. 2,620,314, varied densities being obtainable by altering concentration of the sol and time and temperature of aging.

For many purposes, however, low bulk density has been critically important so that hollow spheres were developed, such as the insulating refractory speroids of mullite which are disclosed by Geiger in U.S. Pat. No. 2,553,759, made by dropping a viscous solution of a combustible material as globules onto finely-divided refractory material, agitating the globules while in contact with a mass of the refractory material, drying the coated globules, and firing them to form the hollow spheroids having wall thicknesses of 8 to 20 thousandths of an inch and diameters such that 60–90% passed a 40-mesh screen. Another main trend, developed even earlier, was the technique of melting or fusing alumina (U.S. Pat. No. 1,682,675 of Horsfield) or mullite (U.S. Pat. No. 2,136,096 of Benner et al) and intercepting the fused material with a high-speed air jet to form hollow globules.

Metal-oxide microspheres having high surface area have also been developed by other methods, such as spray drying a sprayable suspension (20–60%) of finely dispersed oxides to produce microspheres having diameters between 5 and 500μ, as disclosed in Canadian Pat. No. 763,944 of Biegler et al, in which silicic acid is the sole exemplary material. Salt crystals, particles of solvent-soluble plastics, organic materials, and the like are coated by gas plating with a catalytic metal, which may be oxidized, followed by leaching away the crystal or particle according to United States Pat. No. Re. 25,454 of Novak. Another development, described in U.S. Pat. No. 3,792,136 of Schmitt, comprises impregnating hollow thermosetting-resin microspheres with a solution of an oxidizable metal compound, precipitating the metal in situ as hydroxide, slowly drying the impregnated microspheres, carbonizing the resin by heating in an inert atmosphere, and finally igniting in air to produce hollow microspheres of 50 microns to 10 millimeters in diameter.

These prior art developments are suitable for many uses but lack some essential properties for use as a catalyst support in exhaust gas purification. Recent developments have emphasized lare monolithic or honeycombed substrates of aluminum silicates, such as mullite and cordierite, to form catalyst supports having the required physical properties for use in controlling auto exhaust emissions.

Optimum properties for meeting the demanding requirements of emission control include a crush strength of at least 10 pounds, a bulk density below 50 pounds per cubic foot, a uniform, smooth, and dustless surface, catalytic metal deposition to a depth of only 5 mils (127 microns), an air attrition loss of less than 1%, less than 5% shrinkage at 1,800° F for 24 hours with no loss in crush strength or increase in attrition, and a diameter of about 5 × 7 mesh.

Hollow catalyst beads are clearly an answer to such a rigorous bulk density requirement, but the hollow beads of the prior art lack the necessary crush stength, attrition resistance, and uniformly spherical shape. Globular deposition of combustible matter and air blowing of fused oxides appears to produce uneven spheroidicity and wall thickness, and impregnation of organic spheres appears to be incapable of providing thick enough walls for adequate crush strength. A new manufacturing method is needed that will assure close control of sphericity, uniformity of wall thickness and diameter, and precise chemical composition of the hollow beads, pellets or balls.

SUMMARY OF THE INVENTION

It is accordingly an object of this invention to provide a combustible core pellet which is essentially spherical in shape and closely controlled in diameter.

It is another object to provide a method for manufacturing such a core pellet.

It is an additional object to provide a method for depositing metal oxide as a homogeneous layer of substantially uniform thickness onto a core pellet of this invention.

It is a further object to provide a method for closely controlling shrinkage during firing of such a deposited layer by controlling the metal oxide composition thereof.

It is a still further object to provide a method for decomposing the combustible core and for firing the metal oxide so that the porosity and total pore volume in the ceramic shells of the hollow balls are closely controlled.

It is also an object to provide a method for adding a catalytic metal to the hollow ceramic balls of this invention so that the catalytic metal remains at or very close to the surface thereof.

It is also an object of this invention to provide hollow ceramic balls having the physical properties that are required for use in an automotive catalytic muffler.

In satisfaction of these objects and in accordance with the spirit of this invention, combustible cores as dried spherical pellets and a pelletizing method for manufacture thereof are herein provided. Methods comprising rewetting the dried pellets, coating them with a uniformly thick single layer of selected ceramic-forming metal oxide in particulate form, burning out the combustible cores, firing the metal oxide balls, and coating the hollow ceramic balls with a catalytic metal are additionally provided.

The manufacture of the hollow ceramic balls of this invention can be divided into dry core manufacture, ceramic ball manufacture, and finished catalyst manufacture. Ceramic ball manufacture comprises wetting the dried cores, mixing particulate ceramic materials, coating the wet cores with the ceramic material to form pellets, drying the pellets, thermally decomposing the combustible cores therein, firing the shells thereof to form hollow ceramic balls, cooling the balls, and screening them. These steps must be conducted with care, as indicated, for example, by an increase in volume of the cores after the wetting step of up to about 20%. It is also of key importance that the ratio of weight of ceramic coating to volume of core be closely controlled; for mullite, the weight of feed mullite material to dry core volume must be from about 2.0 to 2.4 parts by weight to 1.0 part by volume (200 to 240 grams per 100 cubic centimeters of dry core).

The pelletizing steps include any convenient method of agglomerating a loose powdery material to form a dense uniform agglomerate, pellet, granule, bead, or ball of the desired size and sphericity, such as by adding a binder to the powdery material and extruding, rolling, tumbling, pelletizing, agitating, granulating, "Spherodizing", "Marumerizing", etc. It has, in general, been found that the pelletizing step for the cores benefits from the use of high packing energy so that high-speed agglomeration methods are generally preferred, such as Spherodizing and Marumerizing; however, for the coating step, wherein the non-sticking wet cores are immediately coated with a ceramicforming powder to form spherical bodies which initially appear to be dry but finally appear to be wet but are non-sticking after all of the powder has adhered thereto, relatively gentle agglomeration such as that furnished by a disk pelletizer or a drum type pelletizer is desirable.

Wood flour cores soaked in water, a triethanolamine solution, or an alum solution serve as excellent "seed" upon which the ceramic-forming powder readily adheres during the coating step.

Suitable allowances are made for the swelling characteristics of the combustible material in the cores during the soaking or rewetting step and for the shrinkage or expansion characteristics of the ceramic-forming material during the firing step. For example, in order to obtain hollow ceramic balls of a 5 × 7 mesh size,, it is necessary to manufacture dry cores of a 7 × 8 mesh size when employing RC-874 alumina and to manufacture dry cores of 6 × 7 mesh screen size when employing RC-122 alumina when both aluminas are sintered at 2,950° F (1621° C) because the former alumina undergoes less shrinkage during the firing step.

The addition of triethanolamine, as a wetting and densification agent, causes the powder to be more effectively wetted and the cores to be coated more effectively and quickly. As a binder for the ceramic-forming powder, alum is effective, particularly when milled into the powder.

Hollow ceramic balls calcined at only about 2,750° F (1510° C) may have unacceptable properties because the surface produces dust but generally have excellent, non-dusting surfaces when calcined at 2,950° F (1621° C). Moreover, balls previously fired at 2,750° F (1510° C) for two hours exhibit increased crush strength and bulk density when further heated at 2,950° F for two additional hours, apparently creating stronger ceramic bonds and more shrinkage by further sintering of the alumina.

The ceramic-forming powder is any refractory compound or mixture of compounds capable of forming uniformly hard ceramics when fired, particularly the oxides of titanium, vanadium, aluminum, zirconium, beryllium, calcium, magnesium, and silicon, in various combinations that form compounds such as mullite, forsterite, sillimanite, spinel, and kyanite. Hollow alumina balls have excellent crush strength but relatively high bulk density compared to other ceramics such as mullite. Although lowering the feed weight-to-core volume ratio does reduce the bulk density, it is not possible to do so below about 59 pounds/cubic foot (0.94 g/cc) because the walls of the hollow alumina balls become excessively thin. Mullite, however, possesses both crush strength and bulk density at acceptable levels.

Alumina combined with silica in a mole ratio of 1.5:1.0 produces theoretical mullite, but any reasonable combination of these compounds, also generally termed mullite, may be used to form the oxide coating on the cores. The more alumina in the aluminous ceramic-forming powder, however, the higher the bulk density of the hllow ceramic balls produced therefrom when compared on an equal feed weight-to-core volume ratio. Admixture of kaolin to the ceramic-forming powder produces hollow ceramic balls having significantly reduced crush strength and somewhat lower bulk density, but the use of raw clay instead of a good grade of kaolin is apt to introduce undesirable impurities. Addition of $MgCO_3$ to alumina results in somewhat higher crush strength with little increase in bulk density.

Lowering the feed weight ratio of mullite ceramic-forming powder to core volume from 300 to 275 to 250 grams per 100 cc, after firing at 2,950° F for 2 hours, progressively decreases the bulk density and decreases the crush strength of the hollow mullite balls. Firing mullite balls at 2,750° F for 3 hours, at 2,950° F for 2 hours, and at 3,065° F for two hours progressively decreases bulk density and increases crush strength of the hollow mullite balls. However, at 2,950° F the apparent density of the shell is minimized and the total pore volume is maximized.

Finished catalyst balls, formed by surface coating hollow ceramic balls with platinum and palladium and subjected to catalytic performance tests, conducted according to Test Method TM-176B of the A.C. Spark Plug R&D Laboratories, Flint, Michigan, have been found effective for oxidatively converting 50% of emitted carbon monoxide at 348° F (176° C) and 50% of emitted hydrocarbons at 347° F (175° C).

DESCRIPTION OF THE PREFERRED EMBODIMENTS

Dry Core Manufacture

The core-manufacturing stage comprises preparing an aqueous clay slurry; adding wood flour or other combustible filler material thereto, and mulling the mixture to form a doughy paste; extruding and partially drying the muller discharge without cutting the extrudates; pelletizing the partially dried extrudates which also accomplishes the necessary fragmenting thereof to produce pellets; slowly drying the pellets to form initially dried pellets; screening the dried pellets to produce dry cores having a Loss on Ignition of 50–99% (typically about 81%) and a density of about 27–31 pounds/cubic foot (0.43–0.50 g/cc).

This core manufacturing process is illustrated by the following Examples 1 and 2.

EXAMPLE 1

100 pounds of wood flour were charged to a Simpson mix muller. Mulling was begun while the mix given below was added in five minutes. Mulling was continued for 30 minutes while adding an additional six pounds of demineralized water.

Mix Added to Muller 110 lbs. demineralized H₂O containing:
 1 lb. Dow Corning Fluid 470A
 2.5 lb. Dow "Methocel" 90 HG 100
 15 lb. Ball Clay (Ky. Miss. M & D)
 3 lb. Bentolite L (Bentonite)
 0.05 lb. Pluronic L-61 Defoamer The above mulled mix was then extruded via a Bonnot 4-inch diameter auger extruder equipped with a die plate having openings 0.073 ± 0.001 inches in diameter. Extrudates were collected as solid rods ranging from ~0.5 inch to 6 inches in length in stainless steel pans. It was observed that the extrusion rate was 356 lbs. per hour as wet extrudate or 180 lbs per hour as 210° F dry product.

Immediately after extrusion, 50 lb. batches of wet (fresh) extrudates were charged to a Q-400 Marumerizer. The bottom plate of the Marumerizer was then rotated at 190–200 rpm which effected breaking the extrudates into small pieces which then rounded into near spheres. Total time in the Marumerizer was 15 minutes. Thus, the production rate therein may be defined as:
 1. 50 lb × 4=200 lbs/hr as wet product, or
 2. 101 lbs/hr as dry product (~50.5% dry solids)

The rounded extrudates from the Marumerizer were then dried at 210° F and the screened via a Sweco Vibratory screen so as to collect the desired 7 × 12 mesh (U.S. Standard Sieves) fraction. The product yields after screening were as follows:
 +7 mesh; 0.4%
 Product 7 × 12 mesh; 98.1%
 −12 mesh; 1.5%

The product analyses (7 × 12 mesh fraction) were as follows:

| | | | |
|---|---|---|---|
| 7 × 8 mesh | 10.2 Wt. % | Packed Bulk Density | 27.5 lbs/ft³ |
| 8 × 10 mesh | 82.5 Wt. % | Loss on Ignition | 87% |
| 10 × 12 mesh | 7.3 Wt. % | 1000° C | |

EXAMPLE 2

The procedure of Example 1 was repeated with the exception that the die plate on the Bonnot extruder had openings of 0.120-inch and the extrusion rate was 500 pounds/hr as wet product or 253 pounds/hr as dry product.

The product yields obtained after screening on 5 × 7 mesh (U.S. Standard Sieves) are as follows:
 +5 mesh fraction; 0.7 Wt. %
 5 × 7 mesh fraction; 98.0 Wt. %
 −7 mesh fraction; 1.3 Wt. %

The 5 × 7 mesh product was found to have a packed bulk density of 28.0 pounds per cubic foot and a Loss on Ignition at 1000° C of 86.8 weight percent.

The 5 × 7 mesh product was found to be composed of 39 weight percent of a 5 × 6 mesh fraction and 61 weight percent of a 6 × 7 mesh fraction.

Ceramic Ball Manufacture

In the examples described hereinafter, the wood flour cores of Example I were used as a spherical raw material for forming various uniformly thick coatings thereupon. The physical properties which were sought for the hollow ceramic balls produced therefrom were based upon "Materials Specification No. 580", September 11, 1973, of the A.C. Spark Plug Division of General Motors Corporation, for substrate pellets to be used as oxidation catalysts in a catalytic muffler of an automobile catalyst system. These physical properties are:
 1. Uniform, smooth, dustless surfaces;
 2. Preferred size: 5×7 mesh; permissible 4×8 mesh;
 3. Bulk density: desired as low as possible, below 50 lbs./ft.³, if possible;
 4. Crush strength: minimum 10 lbs., no upper limit;
 5. Air attrition (self attrition) loss of less than 5%; and
 6. Less than 4% shrinkage at 1,800° F for 24 hours with no loss in crush strength or increase in attrition.

Ceramic ball manufacture comprises dry ball mill grinding a ceramic-forming powder, which for mullite comprises alumina, alum, and silica, and optionally adding triethanolamine; screening the ground powder through a 30-mesh screen if necessary; boiling a selected quantity of dried cores with a defoamer and either triethanolamine solution or alum solution, draining the wet, swollen cores; cooling; pelletizing the admixed cores and ground ceramic-forming powder; drying the coated cores to form dried balls; slowly heating the dried balls up to about 600° C in order to decompose the wood flour in the cores and form hollow balls; heating the hollow balls to 1,621° C; soaking the balls at 1,621° C (2,950° F) for 2–4 hours to form ceramic balls having sintered walls; cooling the hollow ceramic balls to room temperature; screening the cooled balls so as to obtain 5 × 7 mesh hollow ceramic balls.

EXAMPLES 3–8

Examples 3 through 8 were each conducted similarly by milling the ceramic-forming powder, alum, and triethanolamine for five minutes and thereafter screening if necessary through a 30-mesh screen. Only Examples 3 and 4 required screening. The silica used in Examples 5–8 was ground silica sold under the trademark, "Supersil", by the Pennsylvania Glass Sand Corporation and further ground via conventional dry ball milling in order to eliminate coarse particles. The feed materials charged for Examples 3–8 are shown in Table I for hollow alumina balls, hollow mullite balls, and hollow kaolin balls (11% kaolin by weight), each being made in duplicate with two aluminas, RC-122BM and RC-24GF.

Dry cores which had been prepared according to Example 1 were boiled in 2% triethanolamine solution, cooled to 70°–80° F, and drained. The cores had swelled about 20% in volume. After 70–80% of the pre-mixed ceramic feed material had been charged to a Dravo disk pelletizer, having a disk diameter of 13.75 inches and side height of 2.5 inches and operating at 40 rpm while inclined approximately 40° from the horizontal, the wet, swollen cores were added to the disk within 10 seconds while a scraper was used to scrape the bottom of the disk and effect rapid tumbling of the cores. The speed was then reduced to 22–26 rpm and the balance of the feed was added. Within two minutes, all of the feed had adhered to the cores and the disk was clean and free of dust. Rotation was continued at 22–26 rpm until the balls appeared to be surface wet but were non-sticking.

TABLE I

| Alumina Used | RC-122BM | RC-24GF |
|---|---|---|
| Balls Containing Al₂O₃ Only | | |
| | Example 3 | Example 4 |
| $Al_2O_3$, g. | 100.0 | 100.0 |
| Anhydrous Alum, g | 7.0 | 7.0 |
| Triethanolamine, g. | 0.6 | 0.6 |
| Balls Containing $Al_2O_3$ and Silica Only ($3Al_2O_3 \cdot 2SiO_2$) | | |
| | Example 5 | Example 6 |
| $Al_2O_3$, g. | 81.0 | 81.0 |
| Supersil Silica, g. | 32.0 | 32.0 |
| Anhydrous Alum, g. | 10.0 | 10.0 |
| Triethanolamine, g. | 0.8 | 0.8 |
| Balls Containing $Al_2O_3$, $SiO_2$ and Kaolin ($3Al_2O_3 \cdot 2SiO_2$) | | |
| | Example 7 | Example 8 |
| $Al_2O_3$, g. | 73.6 | 73.6 |
| Supersil Silica, g. | 27.0 | 27.0 |
| EPK Kaolin, g. | 14.7 | 14.7 |
| Anhydrous Alum, g. | 14.7 | 14.7 |
| Triethanolamine, g. | 1.0 | 1.0 |

The coated cores, as wet-appearing but non-sticking balls, were then slowly dried at a temperature below 220° F, in order to prevent surface cracking. The dried balls, as a 2-inch deep bed, were slowly heated to 600° C at about 100° C per hour so that the moisture was totally removed and most of the combustible core material was volatilized. Thereafter the balls were heated at 200° C per hour to 1,621° C (2,950° F) and held or soaked for two hours. The sintered balls were cooled and were hard and smooth surfaced.

The kaolin present in the wood flour-kaolin cores did not burn out of the hollow ceramic balls but remained within the ball shell as a miniature ball or fragment which was not attached to the larger ceramic shell.

Pertinent physical properties pertaining to the dry cores, soaking solution, coated balls, and hollow ceramic balls after firing for two hours at 2,950° F are presented in Table II for Examples 3–8.

In Table III, additional properties of the shells of the hollow ceramic balls are given. The surface area was calculated from pore volume distribution analysis, and the apparent density was determined by means of a 60,000 psi mercury porosimeter. No additional pore volume was determined after the last figure in each column.

It is apparent that the hollow alumina balls of Examples 3 and 4 are generally comparable, although the RC-24GF balls have a lower apparent density and a higher pore volume than the RC-122BM balls. Although the crush strength is adequate, the apparent density is higher than preferred for automotive use.

The mullite balls of Examples 5 and 6 are much more porous, have lower apparent density, and have greater pore volume than the alumina balls of Examples 3 and 4. Their crush strength is lower but acceptable, and their bulk density is highly satisfactory.

The hollow mullite balls of Examples 7 and 8, with 11% kaolin, have significantly lower crush strength but only slightly lower bulk density and are generally less suitable than the other mullite balls.

Comparing all results for the two types of aluminas in the alumina, mullite, and kaolin balls of Examples 3–8, it is apparent that the two aluminas produce consistently different results: RC-24GF alumina produces hollow ceramic balls that are lower in surface area and in apparent density but higher in total pore volume than RC-122BM alumina.

TABLE II

| | $Al_2O_3$ Only | | $Al_2O_3$ & $SiO_2$ | | $Al_2O_3$, $SiO_2$ & Kaolin | |
|---|---|---|---|---|---|---|
| | RC-122BM | RC-24GF | RC-122BM Mullite | RC-24GF Mullite | RC-122BM Kaolin | RC-24GF Kaolin |
| Example | 3 | 4 | 5 | 6 | 7 | 8 |
| 100cc Dry Cores (Mesh) | 6 × 7 | 6 × 7 | 7 × 10 | 7 × 10 | 7 × 10 | 7 × 10 |
| 100 cc Dry Cores, g | 45.48 | 45.48 | 44.45 | 44.45 | 44.45 | 44.45 |
| 2% TEA Per 100 cc Cores, g | 49.17 | 48.90 | 52.20 | 52.20 | 52.25 | 52.05 |
| Total Feed Used, g | 160.00 | 160.00 | 213.00 | 213.00 | 238.00 | 238.00 |
| Dry Ball Wt., g | 200.25 | 201.10 | 251.80 | 254.60 | 275.90 | 279.05 |
| Fired Ball Wt., g | 157.77 | 158.23 | 206.17 | 206.20 | 219.08 | 219.87 |
| Fired Ball Volume, cc | 170.00 | 171.00 | 316.00 | 322.00 | 350.00 | 365.00 |
| Fired Ball Bulk Density, Lbs./Ft.³ | 57.20 | 57.70 | 40.70 | 40.00 | 39.10 | 37.60 |
| Vol. Change Dry to Fired (%) | −22.02 | −25.65 | +15.75 | +12.20 | +11.82 | +11.82 |
| Screen Anal. Fired Balls | | | | | | |
| +4 Mesh (%) | 0 | 0 | 0 | 0 | 0 | 0 |
| 4 × 5 Mesh (%) | 0.10 | 0.40 | 34.30 | 40.60 | 69.70 | 77.70 |
| 5 × 6 Mesh (%) | 94.90 | 93.60 | 65.70 | 59.40 | 30.30 | 22.30 |
| 6 × 7 Mesh (%) | 5.00 | 6.00 | 0 | 0 | 0 | 0 |
| Bulk Density Fired Balls After Screening | | | | | | |
| Total Product, Lbs./Ft.³ | 59.30 | 58.00 | 40.80 | 40.50 | 39.60 | 37.90 |
| Fired Balls (Avg. 20) | | | | | | |
| Crush, Lb. | 22.60 | 19.90 | 14.20 | 16.00 | 10.80 | 11.50 |
| Mean Crush Diameter, mils | 133.00 | 135.00 | 147.00 | 146.00 | 151.00 | 153.00 |

TABLE III

| Examples | 3 | 4 | 5 | 6 | 7 | 8 |
|---|---|---|---|---|---|---|
| Pore Diameter (microns) | Cumulative vol. of pores at pore dia. shown in cc/kg | | | | | |
| +50.0 | 4 | 4 | 5 | 6 | 6 | 5 |
| +30.0 | 4 | 9 | 7 | 11 | 13 | 14 |
| +20.0 | 4 | 9 | 12 | 13 | 21 | 21 |
| +10.0 | 8 | 13 | 22 | 25 | 51 | 58 |
| + 5.0 | 10 | 15 | 67 | 87 | 155 | 182 |
| + 3.0 | 12 | 18 | 155 | 189 | 233 | 268 |
| + 2.0 | 12 | 24 | 192 | 227 | 265 | 307 |
| + 1.5 | 16 | 31 | 205 | 238 | 280 | 321 |
| + 1.0 | 18 | 44 | 217 | 248 | 293 | 328 |
| + 0.5 | 44 | 68 | 235 | 257 | 304 | 335 |
| + 0.3 | 56 | 75 | 238 | 259 | 306 | — |
| + 0.1 | 60 | — | 240 | — | — | — |

TABLE III-continued

| Examples | 3 | 4 | 5 | 6 | 7 | 8 |
|---|---|---|---|---|---|---|
| Pore Diameter (microns) | Cumulative vol. of pores at pore dia. shown in cc/kg | | | | | |
| Surface Area (m²/g) | 0.358 | 0.271 | 0.409 | 0.325 | 0.349 | 0.318 |
| Apparent Density (g/cc) | 3.230 | 3.100 | 1.800 | 1.730 | 1.790 | 1.550 |
| Total Pore Vol. (cc/g) | 0.060 | 0.075 | 0.240 | 0.259 | 0.306 | 0.335 |

EXAMPLE 9

This example illustrates a preferred embodiment of this invention for preparing hollow ceramic balls.

500 cc of 7 × 12 mesh cores prepared in accordance with Example 1 were boiled for 15 minutes in 500 ml of a 5 Wt. % aqueous solution of $Al_2(SO_4)_3$ 18 $H_2O$. The cores were drained of excess solution and transferred to a sealed bottle and permitted to cool to 80° F.

A mullite feed was prepared by blending the following:
  Calcined alumina, g. (RC-172); 2,270
  Supersil Silica, g.; 882
  Cab-O-Sil Silica, g.; 45
  Anhydrous $Al_2(SO_4)_3$, g.; 253
and adding the same to a five-gallon ball jar containing 55 pounds of one-inch diameter alumina ceramic balls. The jar was sealed and rolled for 2.5 hours on a roller to effect particle size reduction.

The resulting ground powder had a Loss on Ignition at 1,000° C of 5.8%. The ground material was screened through a U.S. Standard 30-mesh screen.

700 grams of said screened mullite feed were charged to a disk pelletizer, having a disk diameter of 14.50 inches and side height of 2.5 inches and operating at 39 rpm while inclined approximately 42° from the horizontal. The cores were added to the disk within 60 seconds and the speed was then reduced to 22 rpm and 400 grams of the mullite feed were added over a five-minute period. Rotation was continued at 22 rpm for 10 additional minutes and the tumbling balls were sprayed with 70–80 grams of water and after about two additional minutes of tumbling they were removed and dried at a temperature of about 220° F for 16 hours. The dried balls, as a 2-inch deep bed, were slowly heated to 1,200° F so that most of the wood flour core was volatilized. Thereafter the balls were heated to 2,950° F over a 6-hour period and held or soaked for three hours. The sintered balls were cooled to 80° F in six hours.

The cooled product was then screened so as to collect a 5 × 7 mesh product.

Pertinent physical properties obtained are as follows:

| | Volume (cc's) | Weight (gms.) | Bulk Density (lbs/ft³) |
|---|---|---|---|
| Cores Prior to Wetting | 500 | 260.6 | 32.5 |
| Cores as Used | 625 | 464.0 | 46.3 |
| Mullite Feed | 1402 | 1100 | 49.0 |
| Wet Balls from Pelletizer | 1836 | 1604.6 | 54.5 |
| Balls Dried at 220° F | 1725 | 1323.1 | 47.9 |
| Balls Fired at 2950° F, 3 hrs. | 1550 | 1079.2 | 43.4 |

Ratio Feed to Dry Cores: 2.20 g feed/cc Dry Cores
Ratio Feed to Wet Cores: 1.76 g feed/cc Wet Cores
Vol. Change Dry to Wet Cores: +25%
Vol. Change Wet Balls to Dry Balls: −6.05%
Vol. Change Dry Balls to Fired Balls: −10.1%
Vol. Change Wet Balls to Fired Balls: −15.6%

| Screen Analysis of All Fired Balls | | Analysis of Product HMCB 5 × 7 Mesh | |
|---|---|---|---|
| +5 mesh | 1.5% | 96.9% | 5 × 6 mesh |
| 5 × 6 mesh | 94.5% | 3.1% | 6 × 7 mesh |
| 6 × 7 mesh | 3.0% | Packed Bulk Density | 43.5 lbs/ft³ |
| −7 mesh | 1.0% | Crush Strength | 16.4 lbs |
| | 100.0% | Air Attrition Loss | 0.88% |

EXAMPLES 10–12

To test the effect of wall thickness upon the physical properties of hollow ceramic balls, mullite was added to wet cores as in Examples 5 and 6 at three loading levels of 300 grams, 275 grams, and 250 grams per 100 cc of core. The data are shown in Table IV after firing at 2950° F for two hours.

As the loading decreases, it is apparent that bulk density, crush strength, and ball diameter also decrease, but volume change increases.

Table IV

| | Hollow Mullite Balls | | | | | | |
|---|---|---|---|---|---|---|---|
| Ex. No. | Loading Level g/100cc | Bulk Density (pcf) | Volume Change (%) | Crush Strength (lbs.) | Crush Ball Dia. (Mils) | Size Analysis 4×5 (%) | 5×6 (%) |
| 10 | 300 | 44.5 | +12.9 | 22.8 | 164 | 85.1 | 14.9 |
| 11 | 275 | 42.8 | +14.6 | 18.8 | 161 | 76.0 | 24.0 |
| 12 | 250 | 41.7 | +16.6 | 16.5 | 156 | 44.4 | 55.6 |

EXAMPLES 13–15

To test the effect of firing temperature, mullite was used to coat wet cores according to the procedure of Examples 5 and 6 at a loading of 300 grams of mullite feed powder per 100 cc of core volume using RC-874 alumina. The mullite coated balls were fired at three temperatures, as shown in Table V; namely, 2750° F for three hours in Example 13, at 2950° F for two hours in Example 14, and at 3065° F for two hours in Example 15. The size distributions of the hollow mullite balls produced in each example were 25–30% collected as 4×5 mesh and 70–75% collected as 5×6 mesh. Separate analyses were made for each fraction, weighted averages being given in Table V.

Table V

| Example No. | 13 | 14 | 15 |
|---|---|---|---|
| Calcination Temperature, ° F. | 2750 | 2950 | 3065 |
| Soak Time, Hours | 3 | 2 | 2 |
| Pore Diameter, microns | Cummulative Pore Volume cc/kg | | |
| 30.00 | 6 | 11 | 11 |
| 20.00 | 9 | 15 | 16 |
| 15.00 | 12 | 33 | 33 |
| 10.00 | 15 | 42 | 46 |
| 5.00 | 24 | 117 | 142 |
| 3.00 | 60 | 177 | 186 |
| 2.00 | 115 | 208 | 205 |
| 1.50 | 139 | 223 | 210 |
| 1.00 | 163 | 232 | 216 |
| 0.50 | 196 | 245 | 221 |
| 0.30 | 206 | 247 | 221 |
| 0.10 | 209 | 247 | 221 |
| 0.05 | 209 | 247 | 221 |
| Apparent Density of Shell, g/cc | 1.890 | 1.750 | 1.820 |
| Calculated Absolute Density of Shell, g/cc | 3.130 | 3.090 | 3.050 |
| Calculated Surface Area of | | | |

Table V-continued

| | | | |
|---|---|---|---|
| Shell, $m^2/g$ | 0.599 | 0.850 | 0.192 |
| Total Pore Volume, cc/g | 0.209 | 0.247 | 0.221 |
| Volume Change Green to Fired Product | +8.60% | +13.20% | +17.00% |
| Crush Strength of Fired Product, lbs | 15.000 | 22.400 | 23.800 |
| Dia. of Crush Strength Specimens, In. | 0.147 | 0.162 | 0.152 |
| Bulk Density of Fired Product, $lb/ft.^3$ | 46.300 | 44.500 | 42.600 |

$$1 - \frac{\text{(Fired Bulk Density, pcf)}}{\text{(Corrected Bulk Density, pcf)}} \times 100 = \% \text{ Volume Change}$$

The original bulk density of 5×6 mesh dry balls (unfired) was 61.9 pcf (pounds/cubic foot); this was changed to the corrected bulk density of 51.3 pcf by deducting the firing weight loss of 17.1%. Volume change was then corrected as follows to obtain the "volume change of green to fired product", as shown for Example 14 (+13.2%).

EXAMPLES 16-19

The effect of variations in silica content of mullites was investigated in Examples 16-19 wherein silica content was varied from about 28% to about 40%, producing negligible differences in essential properties. The proportions of the ingredients are shown in Table VI, wherein Example 16 corresponds to theoretical mullite.

The ingredients in each example, as given in Table VII, were mixed with 17.50 grams of alum and 3.5 grams of triethanolamine by milling for one hour in a 7-liter ball jar containing 7000 g balls, Red Devil milling for one minute to deagglomerate, and screening to −30 mesh. The triethanolamine, though not necessary, is helpful as a wetting and densification agent.

Table VI

| Example No. | $Al_2O_3$ (%) | $SiO_2$ (%) | MgO (%) | Weight Ratio $Al_2O_3/SiO_2$ | Mole Ratio $Al_2O_3/SiO_2$ |
|---|---|---|---|---|---|
| 16 | 71.8 | 28.2 | 0 | 2.5461 | 1.5000/1 |
| 17 | 67.4 | 32.6 | 0 | 2.0675 | 1.216/1 |
| 18 | 63.6 | 36.4 | 0 | 1.7473 | 1.0278/1 |
| 19 | 59.8 | 40.2 | 0 | 1.4876 | 1/1.1428 |

Table VII

| Example No. | (Alumina) RC-122BM (grams) | (Silica) Supersil (grams) | Total Mix (grams) |
|---|---|---|---|
| 16 | 246.05 | 98.70 | 365.75 |
| 17 | 230.65 | 114.10 | 365.75 |
| 18 | 217.35 | 127.40 | 365.75 |
| 19 | 204.05 | 140.70 | 365.75 |

Properties of the dry product, after coating with the mullite compositions of Table VII at 250g/100cc of core volume, and screening through a 5×6 mesh screen, and of the hollow mullite balls after firing at 2950° F for two hours, are shown in Table VIII.

Table VIII

| Example No. | 16 | 17 | 18 | 19 |
|---|---|---|---|---|
| Dry Product Weight, g | 99.65 | 93.10 | 94.40 | 95.75 |
| Weight Fired Product, g | 84.92 | 79.01 | 80.10 | 81.20 |
| LOI, Dry to Fired, % | 14.78 | 15.13 | 15.15 | 15.20 |
| Volume Fired Product, cc | 113.00 | 110.00 | 111.00 | 112.00 |
| Bulk Density Fired Product, pcf | 46.90 | 44.80 | 45.00 | 45.20 |
| Observed Volume Change, % | +13.00 | +10.00 | +11.00 | +12.00 |
| Crush, lb. | 16.30 | 16.70 | 16.70 | 14.60 |
| Diameter, mils | 146.00 | 143.00 | 147.00 | 146.00 |

The bulk densities and crush strengths of these mullites are generally comparable to those of Example 11.

EXAMPLE 20

Wood flour cores of a 7×8 mesh size, after preparation as in Example 1, were coated in a coat-pelletizing operation with a ceramic-forming powder consisting of about 1% $MgCO_3$, about 5% alum, and about 94% alumina, using two aluminas to make two types of comparable hollow alumina balls passing a 4×6 mesh size. Comparable balls without the $MgCO_3$ were also prepared. The two types of alumina balls containing $MgCO_3$ had crush strengths of 88 and 70 pounds in comparison with respective crush strengths of 66 pounds for each of the two types of alumina balls without $MgCO_3$.

The kaolin-containing cores, after volatilization of combustible matter, reduce to a very small kaolin ball within but not attached to the much larger ceramic ball. This kaolin core contributes about 2-4% of the total weight of hollow alumina balls, assuming a bulk density of 58-60 pounds/cubic foot, and 1-3% of the total weight of hollow mullite balls, assuming a bulk density of 40-45 pounds/cubic foot.

It is additionally within the scope of this invention to prepare essentially spherical cores consisting of 100% combustible materials. Wood flour, groundwood pulp, chopped nylon, or other filler may be bound with epoxy, phenolic, urea-formaldehyde or other suitable resin binder, for example, provided that the paste prepared therefrom is suitable for core pelletizing to form compact and highly spherical core pellets and provided further that the ceramic-forming materials adhere to these cores during coating of the pellets.

Catalyst Ball Manufacture

Specification No. 576 and Specification No. 580 of the General Motors Corporation, for fresh oxidation catalysts to be used in automotive exhaust mufflers, require that 50% of the carbon monoxide (CO) and 50% of the hydrocarbon (HC) gases being passed through a heated bed of catalyst balls or extrudates be converted to $CO_2$ and $H_2O$ at a maximum temperature of 360° F (182° C). Specification No. 576 pertains to catalysts containing lowest levels of platinum and palladium, and Specification No. 580 pertains to catalysts containing high levels of these metals, based upon an assumed bulk density of 43.0 pounds/cubic foot (0.688 g/cc), as shown in Table IX in troy ounces per cubic foot of catalyst.

Table IX

| Catalyst | Spec. No. 576 | Spec. No. 580 |
|---|---|---|
| Platinum | 0.237 | 0.386 |
| Palladium | 0.095 | 0.154 |

EXAMPLES 21-23

Hollow ceramic balls of alumina and mullite, prepared according to the preceding examples, were coated with platinum and palladium by rolling the balls and a solution of platinum and palladium chlorides in a polystyrene jar while evaporating the solution by means of a hot air blower which blew hot air into and around the rolling mass. As the solution evaporated, the metallic salts migrated to the surfaces of the ceramic balls, forming salt crystals. When the dried balls were heated at 982° C for 1½ to 2 hours in an oxidizing atmosphere, the salts decomposed to elemental Pt and Pd.

Microscopic examination of the test catalyst samples indicated that the platinum and palladium were randomly distributed on the surfaces of the balls and varied greatly from ball to ball in apparent amounts of Pt and Pd present thereon.

Catalytic performance tests were conducted, according to AC Test Method TM-176B of the A.C. Spark Plug Research and Development Laboratories, Flint, Michigan, on hollow mullite (Examples 21 and 22) and alumina (Example 23) balls upon which platinum and palladium chlorides had been deposited and which were subsequently heated in an oxidizing atmosphere to decompose the noble metal salts to elemental platinum and palladium. Test Method TM-176B (now TM-176C) is a rapid screening test developed to eliminate those catalysts having poor catalytic properties; it does not evaluate a catalyst as to durability.

Physical properties and catalytic test data for Examples 21-23, in which 30-cc samples were tested according to GM Specifications 576 and 580, are given in Table X. Loss to breakage during manufacture of the hollow ceramic balls was less than 0.5% for each of the Examples 21-23.

Table X

| Example No. | 21 | 22 | 23 |
|---|---|---|---|
| Support Base | Mullite | Mullite | Alumina |
| GM Spec. Re Pt, Pd Content | 580 | 576 | 580 |
| Bulk Density (lb/ft$^3$) | 40.50 | 40.50 | 58.00 |
| Crush Strength (lbs.) | 14.50 | 14.00 | 24.00 |
| Approximate Surface Area (m$^2$/g) | 2.10 | 1.82 | 1.45 |
| Screen Size (mesh) | 5 × 7 | 5 × 7 | 5 × 7 |
| Actual Addition of: | | | |
| Pt(%) | 0.062 | 0.038 | 0.046 |
| Pd(%) | 0.024 | 0.015 | 0.018 |
| Temperature, ° F, for 50% conversion of: | | | |
| CO | 348.000 | 362.300 | 450.000 |
| HC | 347.300 | 361.600 | 450.000 |

The ratio of feed weight-to-core volume was 215:100 for Examples 21-22 (mullite) and 160:100 for Example 23 (alumina). In order to obtain a slightly higher crush strength, the ratio of feed weight-to-core volume for mullite may be increased to about 220g:100cc.

The cumulative pore volume, in cc/kg, measured from 50 microns through 0.1 micron, for the balls of Examples 21 and 22 was 207, and for the balls of Example 23 was 56.

As Table X shows, Example 21 easily passed the 360° F temperature requirement of General Motors Specifications 576 and 580, and Example 22 nearly did so. These results clearly demonstrate that a satisfactory oxidizing catalyst can be made by using hollow ceramic balls as catalyst supports for elemental platinum and palladium metals and further indicate that a satisfactory oxidizing catalyst according to General Motors Specifications 576 and 580 can be made by using hollow mullite balls as catalyst supports for elemental platinum and palladium which are formed on the surface thereof after deposition of platinum and palladium chlorides and subsequent heating of the dried salts in an oxidizing atmosphere in order to decompose the noble metal salts to elemental platinum and palladium. Others ways of depositing platinum and palladium such as vacuum deposition can be used. A particular advantage of the novel product of this invention resides in the ease of recovery of the platinum and palladium from the spent catalyst via a simple leach with aqua regia. It has been found that such treatment does not adversely affect the physical properties of the hollow balls which can be recoated with platinum and/or palladium and reused. This is a surprising advantage over presently employed catalysts.

EXAMPLE 24

The procedure of Examples 3 (alumina) and 9 (mullite) were repeated and the resulting hollow ceramic balls, after screening to 5 × 7 mesh, were mixed to insure homogeneity. One hundred cc of each product were placed in platinum dishes and inserted in a furnace maintained at 1800° F (982° C) for periods of time of 24, 48, and 72 hours.

The products so treated were removed from the furnace, rapidly cooled in air and then analyzed. The results obtained are shown in the following tables:

TABLE

| | Procedure of Example 9 | | | |
|---|---|---|---|---|
| Time (Hours) | 0 | 24 | 48 | 72 |
| Crush Strength[1] (lbs load) | 15.5 ± 1 | 15.5 ± 1 | 15.5 ± 1 | 15.5 ± 1 |
| Air Attrition Loss[1] (%) | 0.7 ± 0.2 | 0.7 ± 0.2 | 0.7 ± 0.2 | 0.7 ± 0.2 |
| Packed Bulk Density[1] (lbs/ft$^3$) | 44 ± 0.5 | 44 ± 0.5 | 44 ± 0.5 | 44 ± 0.5 |
| Apparent Density[2] (g/cc) | 1.75 ± 0.02 | 1.75 ± 0.02 | 1.75 ± 0.02 | 1.75 ± 0.02 |
| Pore Diameter (microns) | (Cummulative Volume of Pores in cc/kg) | | | |
| 50 | 6 | 6 | 5 | 6 |
| 30 | 12 | 12 | 10 | 11 |
| 20 | 17 | 18 | 16 | 18 |
| 10 | 58 | 60 | 54 | 56 |
| 5 | 109 | 110 | 114 | 110 |
| 3 | 154 | 155 | 158 | 152 |
| 2 | 180 | 177 | 182 | 181 |
| 1.5 | 192 | 191 | 195 | 193 |
| 1 | 210 | 209 | 213 | 211 |
| 0.5 | 224 | 225 | 230 | 226 |
| 0.3 | 243 | 242 | 249 | 244 |
| 0.1 | 249 | 251 | 253 | 250 |
| <0.1 | Nil | Nil | Nil | Nil |
| Volume Change[3] (%) | 0.0 | 0.0 | 0.0 | 0.0 |
| Surface Area[4] (m$^2$/g) | <1 | <1 | <1 | <1 |

[1]Determined on whole balls
[2]Determined on ball shells using 60,000 psi mercury porosimeter
[3]Observed volume change from original product to heat treated product
[4]Determined using nitrogen adsportion method ("sorptometer")

TABLE

| | Procedure of Example 3 | | | |
|---|---|---|---|---|
| Time (Hours) | 0 | 24 | 48 | 72 |
| Crush Strength[1] (lbs Load) | 23 ± 1 | 23 ± 1 | 23 ± 1 | 23 ± 1 |
| Air Attrition Loss[1] (%) | 0.9 ± 0.2 | 0.9 ± 0.2 | 0.9 ± 0.2 | 0.9 ± 0.2 |
| Packed Bulk Density[1] | 59 ± 0.5 | 59 ± 0.5 | 59 ± 0.5 | 59 ± 0.5 |
| Apparent Density[2] (g/cc) | 3.22 ± 0.02 | 3.22 ± 0.02 | 3.22 ± 0.02 | 3.22 ± 0.02 |
| Pore Diameter (microns) | (Cummulative Volume of Pores in cc/kg) | | | |
| 50 | 4 | 4 | 4 | 4 |
| 30 | 4 | 4 | 4 | 4 |
| 20 | 5 | 4 | 6 | 5 |
| 10 | 9 | 9 | 8 | 8 |
| 5 | 11 | 11 | 10 | 10 |
| 3 | 12 | 13 | 14 | 12 |
| 2 | 12 | 13 | 14 | 13 |
| 1.5 | 15 | 18 | 16 | 15 |
| 1 | 18 | 20 | 18 | 19 |
| 0.5 | 49 | 48 | 44 | 45 |
| 0.3 | 55 | 60 | 59 | 57 |
| 0.1 | 61 | 63 | 62 | 62 |
| <0.1 | Nil | Nil | Nil | Nil |
| Volume Change[3] (%) | 0.0 | 0.0 | 0.0 | 0.0 |
| Surface Area[4] (m$^2$/g) | <1 | <1 | <1 | <1 |

[1]Determined on whole balls
[2]Determined on ball shells using 60,000 psi mercury porosimeter
[3]Observed volume change from original product to heat treated product
[4]Determined using nitrogen adsorption method ("sorptometer")

As can be seen from the above table, the products obtained were thermally stable. Note that in each instance the physical properties of the thermally treated products were essentially the same as the untreated mterial, i.e. 0 hours.

EXAMPLE 25

This example illustrates that platinum and palladium can be recovered in essentially 100% yields without affecting the physical properties of the hollow ceramic balls.

The procedure of Example 9 was repeated and the resulting product was blended after screening to 5 × 7 mesh. 500 cc of the above were coated with platinum and palladium and then heated for 24 hours at 1800° F.

A portion of the material obtained was then leached by boiling for 30 minutes in aqua regia (150 ml of concentrated hydrochloric acid, plus 50 ml of concentrated nitric acid, plus 200 ml of distilled water). The liquid was poured off and the aqua regia treatment was repeated twice more. After the third aqua regia treatment, the product was washed with water and dried for 16 hours at 300° C. This procedure is referred to as first leach cycle.

The leached dried product was again coated with platinum and palladium and the first leach cycle was repeated. This treatment is referred to as second leach cycle and the product obtained is referred to as FINAL PRODUCT.

The physical properties of the original and final product were as follows:

| | Original Product | Final Product |
|---|---|---|
| Packed Bulk Density[1] (lbs/ft[3]) | 44 ± 0.5 | 44 ± 0.5 |
| Crush Strength[1] (load lbs) | 15.5 ± 1 | 15.5 ± 1 |
| Air Attrition Loss[1] (%) | 0.7 ± 0.2 | 0.7 ± 0.2 |
| Apparent Density[2] (g/cc) | 1.75 ± 0.02 | 1.75 ± 0.02 |
| Surface Area[3] (m$^2$/g) | <1 | <1 |

Weight Loss to First Leach Cycle 0.20%
Weight Loss to Second Leach Cycle 0.00%
Pt & Pd recovered from First Leach Cycle >99%

-continued

Pt & Pd recovered from Second Leach Cycle >99%

[1]determined on whole balls
[2]determined on shells of balls using a 60,000 psi mercury porosimeter
[3]determined on shells of balls using nitrogen absorption techniques ("sorptometer")

Because it will be readily apparent to those skilled in the art that innumerable variations, modifications, applications, and extensions of these examples and principles can be made without departing from the spirit and scope of the invention, what is herein defined as such scope and is desired to be protected should be measured, and the invention should be limited, only by the following claims.

GLOSSARY OF TERMS

RC-122BM — A product of Reynolds Metals Company which is a ceramic grade low soda calcined alumina having an average crystal size of about 2.8 microns and ball mill ground to −325 mesh.

RC-24GF — A product of Reynolds Metals Company which is a ceramic grade normal soda calcined alumina ground to −325 mesh via jet impact mill and having an average crystal size of about 2.5-2.7 microns.

RC-172 — A product of Reynolds Metals Company which is a ceramic grade low soda calcined alumina having an average crystal size of about 0.7 microns.

RC-874 — A product of Reynolds Metals Company which is a ceramic grade calcined alumina having a soda content of about 0.06 - 0.12 weight percent ground to ultimate crystals via dry ball mill having an average crystal size of about 1.8 microns and characterized by high compacted density.

Pluronic L-61 — A nonionic difunctional block-polymer terminating in primary hydroxyl groups as polyoxyalkylene derivatives of propylene glycol which is a product of Wyandotte Chemical Corporation.

Methocel 90HG100 — A cellulose ether manufactured by Dow Chemical Company.

Dow Corning Fluid 470-A — A silicon glycol manufactured by Dow-Corning Corporation.

Cab-O-Sil — An ultrafine high purity silica manufactured by Cabot Corporation.

EPK Kaolin — A water washed Florida kaolin sold by Tam, a division of National Lead Industries.

Bentolite L — A white low gel Bentonite sold by Southern Clay Products, Inc.

What is claimed is:

1. A method of producing hollow ceramic balls of spherical shape having a smooth and dustfree surface and a crush strength of at least 10 pounds, comprising:
   A. producing dried spherical pellets of largely combustible material, comprising the following steps:
      1. forming a slurry comprising a clay, a combustible binder, and water,
      2. admixing a particulate combustible filler material with said slurry to form an extrusion mass, the weight of said filler material being at least five times the weight of said clay,
      3. extruding said mass,
      4. pelletizing the product from step 3 with input of high packing energy to form wet, compacted spherical pellets, and
      5. drying said pellets to obtain said dried spherical pellets of largely combustible material;
   B. boiling said dried spherical pellets in a liquid selected from the group consisting of water, a solution of triethanolamine, and an alum solution;
   C. draining and cooling said pellets:
   D. coating said pellets, as cores, with a ceramic-forming powder to obtain a homogeneous deposit of substantially uniform thickness, said coating operation being conducted with gentle tumbling action, and continuing said tumbling of the coated pellets to form wet-appearing but non-sticking balls;
   E. slowly drying said wet-appearing but non-sticking balls to prevent surface cracking;
   F. preheating said balls to volatilize said cores, then firing the balls to form hollow ceramic balls at sintering temperatures sufficient to form a smooth and dust-free surface and sufficient for substantially eliminating pores of a diameter up to three-tenths micron in their fired ceramic walls; and
   G. cooling and recovering said hollow ceramic balls.

2. The method of claim 1 wherein said combustible material is wood flour, the weight of said wood flour being approximately six times the weight of said clay, and the dried pellets having a loss on ignition of at least about 75% at 1000° C for 24 hours.

3. The method of claim 2 wherein said pelletizing is performed in a Marumerizer.

4. The method of claim 1 wherein said ceramic-forming powder is a mullite mix and said hollow ceramic balls have a bulk density below 50 pounds per cubic foot.

5. The method of claim 4 wherein said mullite mix has a mole ratio of $Al_2O_3:SiO_2$ from 1.70:1.0 to 1.0:1.2.

6. The method of claim 5 wherein said ceramic-forming powder comprises approximately 65 weight percent alumina, approximately 27 weight percent silica, and approximately 8 weight percent alum.

7. The method of claim 6 wherein said alumina, silica and alum, together with triethanolamine as a wetting and densifying agent, are premixed before charging to said coating operation.

8. The method of claim 1 wherein the drained pellets following said boiling are swollen approximately 20% in volume.

9. The method of claim 1 wherein said ceramic-forming powder is charged to said coating operation at a feed ratio of about 200–240 grams:100 cc by volume of said dried cores.

10. The method of claim 1 wherein said balls are preheated gradually to about 600° C, at approximately 100° C per hour.

11. The method of claim 10 wherein the preheated balls are heated to about 2800°–3000° F (1538°–1649° C), as said sintering temperatures, at approximately 200° C per hour.

12. The method of claim 11 wherein said balls are heated for about two hours at said 2800°–3000° F.

13. Hollow ceramic balls as catalyst supports for use in a catalytic muffler of an automobile catalyst system, having the following physical properties:
   A. sintered and non-porous walls with smooth, hard, and dust-free outer surfaces,
   B. approximately 5×7 mesh size,
   C. bulk density below 50 pounds per cubic foot,
   D. minimum crush strength of 10 pounds,
   E. air attrition loss of less than 5%,
   F. less than 5% shrinkage at 1,800° F for 24 hours with no loss in crush strength or increase in compaction, and
   G. a miniscule kaolin ball therewithin.

14. The hollow ceramic balls of claim 13 wherein said ceramic is a fired refractory alumina composition having a bulk density below 60 pounds per cubic foot and a crush strength of at least 20 pounds.

15. The hollow ceramic balls of claim 13 wherein said ceramic is a fired refractory mullite mix having a composition from about 1.7 mols $Al_2O_3$: 1.0 mols $SiO_2$ to about 1.0 mols $Al_2O_3$: 1.2 mols $SiO_2$, a bulk density below 47 pounds per cubic foot, and a crush strength of at least 10 pounds.

16. A method for preparing a fresh oxidation catalyst, for use in a catalytic muffler of an automobile catalyst system, having the following physical properties:
   1. uniform, smooth, dustless surfaces with a surface area less than 10 $m^2/g$;
   2. approximately 5 × 7 mesh size;
   3. bulk density below 50 pounds per cubic foot;
   4. minumum crush strength of 10 pounds;
   5. air attrition loss of less than 5%; and
   6. less than 5% shrinkage at 1,800° F for 24 hours with no loss in crush strength or increase in compaction, said method comprising:
      A. manufacturing largely combustible cores as dried spherical pellets, having a Loss on Ignition of 50–99% and a bulk density of about 27–31 pounds/cubic foot, by hgh-speed agglomeration of a combustible binder and combustible filler material with input of high packing energy, said dried spherical pellets having a size analysis of about 5×7 mesh and a packed bulk density of 27–31 pounds per cubic foot;
      B. manufacturing hollow ceramic balls, having smooth, hard, and dust-free outer surfaces, sintered and non-porous walls in which pores up to 0.3 micron are substantially eliminated, a crush strength of at least 10 pounds, and a bulk density below 50 pounds per cubic foot, by the steps of:
         1. wetting said dried spherical pellets to form non-sticking wet cores;
         2. coating said non-sticking wet cores, by gentle agglomeration, with a ceramic-forming powder to obtain a homogeneous deposit of substantially uniform thickness and to make wet-appearing but non-sticking spherical balls,
3. slowly drying said wet-appearing but non-sticking spherical balls to form dried balls by removing moisture totally and volatilizing most of said combustible binder and said combustible filler material, and
4. heating said dried balls to form said hollow ceramic balls at sintering temperatures sufficient to form said sintered and non-porous walls; and C. randomly distributing an elemental catalyst only on said smooth, hard, and dust-free outer surfaces of said hollow ceramic balls by the steps of:
1. depositing a metallic salt, selected from the group consisting of platinum and palladium salts, on said surfaces, and
2. decomposing said metallic salt to said elemental catalyst by heating said hollow ceramic balls in an oxidizing atmosphere.

17. In a method for preparing a fresh oxidation catalyst, for use in a catalytic muffler of an automobile catalyst system, having the following physical properties:
1. uniform, smooth, dustless surfaces;
2. approximately 5×7 mesh size;
3. bulk density below 50 pounds per cubic foot;
4. minimum crush strength of 10 pounds;
5. air attrition loss of less than 5%; and
6. less than 5% shrinkage at 1,800° F for 24 hours with no loss in crush strength or increase in compaction, the improvement comprising:
A. manufacturing combustible cores as dried spherical pellets from a combustible binder and a combustible filler material with input of high packing energy;
B. manufacturing hollow ceramic balls having said physical properties, comprising the following steps:
1. boiling, draining, and cooling said dried spherical pellets to produce wet, swollen cores,
2. coating said wet, swollen cores by gentle agglomeration with a ceramic-forming powder, at a feed ratio of about 200-240 grams: 100 cc by volume of said dried spherical pellets, to make wet-appearing but non-sticking spherical balls,
3. slowly drying and then heating said wet-appearing but non-sticking spherical balls to produce said hollow ceramic balls; and
C. randomly distributing an elemental catalyst on said smooth, hard, and dust-free surfaces of said hollow ceramic balls.

18. A method for reconditioning hollow ceramic balls having sintered walls and containing a spent elemental catalyst deposited on the surfaces thereof without adversely affecting the physical properties of said balls to produce a fresh oxidation catalyst, for use in a catalytic muffler of an automobile catalyst system, having the following physical properties:
1. uniform, smooth, dustless surfaces with a surface area less than 10 m²/g;
2. approximately 5×7 mesh size;
3. bulk density below 50 pounds per cubic foot;
4. minimum crush strength of 10 pounds;
5. air attrition loss of less than 5%; and
6. less than 5% shrinkage at 1,800° F for 24 hours with no loss in crush strength or increase in compaction, said method comprising:
A. leaching said spent elemental catalyst with aqua regia to form leached balls,
B. coating said leached balls with a noble salt selected from the group consisting of platinum and palladium salts,
C. drying said balls so that said noble salt migrates to said surfaces to form salt crystals therein, and
D. heating said hollow ceramic balls in an oxidizing atmosphere to decompose said salt crystals to a fresh elemental catalyst.

19. Catalyst material for use in a catalytic muffler of an automobile catalyst system, comprising:
A. hollow ceramic balls as a catalyst support, said hollow ceramic balls having the following physical properties:
1. uniform, smooth, dustless surfaces with a surface area less than 10 m²/g,
2. approximately 5 × 7 mesh size,
3. bulk density below 50 pounds per cubic foot,
4. minimum crush strength of 10 pounds,
5. air attrition loss of less than 5%,
6. less than 5% shrinkage at 1,800° F for 24 hours with no loss in crush strength or increase in compaction, and
7. a miniscule kaolin ball therewithin; and
B. A catalytic metal deposited on said uniform, smooth, and dustless surfaces, said catalytic metal comprising platinum and palladium.

* * * * *